United States Patent
Yang

(10) Patent No.: US 11,681,615 B2
(45) Date of Patent: Jun. 20, 2023

(54) GARBAGE COLLECTION OPERATION MANAGEMENT BASED ON OVERALL VALID PAGE PERCENTAGE OF SOURCE BLOCK AND CANDIDATE SOURCE BLOCK

(71) Applicant: Silicon Motion, Inc., Hsinchu County (TW)

(72) Inventor: Tzu-Yi Yang, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 17/206,149

(22) Filed: Mar. 19, 2021

(65) Prior Publication Data

US 2022/0261344 A1 Aug. 18, 2022

Related U.S. Application Data

(63) Continuation of application No. 17/179,342, filed on Feb. 18, 2021, now Pat. No. 11,494,299.

(51) Int. Cl.
G06F 12/02 (2006.01)

(52) U.S. Cl.
CPC ...... G06F 12/0253 (2013.01); G06F 12/0246 (2013.01); *G06F 2212/7205* (2013.01)

(58) Field of Classification Search
CPC ............. G06F 12/0253; G06F 12/0246; G06F 2212/7205
See application file for complete search history.

(56) References Cited

U.S. PATENT DOCUMENTS

| | | | |
|---|---|---|---|
| 8,725,931 B1* | 5/2014 | Kang | G06F 13/1642 710/52 |
| 9,405,670 B2 | 8/2016 | Pan | |
| 9,645,922 B2 | 5/2017 | Ouyang | |
| 9,864,526 B2 | 1/2018 | Koo | |
| 9,898,404 B2 | 2/2018 | Huang | |
| 2004/0177212 A1 | 9/2004 | Chang | |
| 2007/0061502 A1 | 3/2007 | Lasser | |
| 2008/0147998 A1 | 6/2008 | Jeong | |
| 2010/0100663 A1 | 4/2010 | Kao | |
| 2012/0213005 A1 | 8/2012 | Lee | |

(Continued)

FOREIGN PATENT DOCUMENTS

| | | |
|---|---|---|
| CN | 102646447 A | 8/2012 |
| CN | 106547703 A | 3/2017 |

(Continued)

OTHER PUBLICATIONS

Yang, the specification, including the claims, and drawings in the U.S. Appl. No. 17/206,137, filed Mar. 19, 2021.

(Continued)

*Primary Examiner* — Tasnima Matin
(74) *Attorney, Agent, or Firm* — Winston Hsu

(57) ABSTRACT

A method of managing a garbage collection (GC) operation includes: comprising: selecting a source block and at least one candidate source block from the flash memory; calculating an overall valid page percentage according to a number of valid pages in the source block and the at least one candidate source block; determining a GC-to-host base ratio according to the overall valid page percentage; and performing the GC operation on the source block according to at least the GC-to-host base ratio.

15 Claims, 13 Drawing Sheets

(56) References Cited

U.S. PATENT DOCUMENTS

| | | |
|---|---|---|
| 2015/0046635 A1 | 2/2015 | Fitzpatrick |
| 2015/0169230 A1 | 6/2015 | Asnaashari |
| 2015/0261671 A1 | 9/2015 | Chu |
| 2016/0092120 A1 | 3/2016 | Liu |
| 2016/0179386 A1 | 6/2016 | Zhang |
| 2017/0168951 A1 | 6/2017 | Kanno |
| 2017/0242790 A1 | 8/2017 | O'Krafka |
| 2017/0255405 A1* | 9/2017 | Zettsu ............... G06F 3/0647 |
| 2017/0285945 A1 | 10/2017 | Kryvaltsevich |
| 2017/0286288 A1 | 10/2017 | Higgins |
| 2018/0275915 A1 | 9/2018 | Ke |
| 2019/0121725 A1 | 4/2019 | Sehgal |
| 2019/0227927 A1 | 7/2019 | Miao |
| 2020/0097403 A1 | 3/2020 | Saxena |
| 2020/0110698 A1 | 4/2020 | Kanno |
| 2020/0257621 A1 | 8/2020 | Pletka |
| 2021/0173558 A1 | 6/2021 | Kashyap |
| 2021/0224187 A1* | 7/2021 | Um ................ G06F 12/0882 |
| 2021/0405900 A1 | 12/2021 | Kurita |

FOREIGN PATENT DOCUMENTS

| | | |
|---|---|---|
| CN | 110058794 A | 7/2019 |
| CN | 110489354 A | 11/2019 |
| CN | 111045956 A | 4/2020 |
| CN | 111930301 A | 11/2020 |
| TW | 201015581 | 4/2010 |
| TW | I376600 | 11/2012 |
| TW | 201342057 A | 10/2013 |
| TW | I519950 B | 2/2016 |
| TW | 201915742 A | 4/2019 |
| TW | 201928678 A | 7/2019 |
| TW | I670594 B | 9/2019 |
| TW | 202011186 A | 3/2020 |
| TW | 202024901 A | 7/2020 |

OTHER PUBLICATIONS

Yang, the specification, including the claims, and drawings in the U.S. Appl. No. 17/206,147, filed Mar. 19, 2021.

* cited by examiner

GARBAGE COLLECTION OPERATION MANAGEMENT BASED ON OVERALL VALID PAGE PERCENTAGE OF SOURCE BLOCK AND CANDIDATE SOURCE BLOCK

CROSS REFERENCE TO RELATED APPLICATIONS

This application is a continuation application of U.S. application Ser. No. 17/179,342, filed on Feb. 18, 2021. The entire contents of the related applications are incorporated herein by reference.

BACKGROUND OF THE INVENTION

1. Field of the Invention

The present invention relates to flash memory, and more particularly to, methods and apparatuses for managing a garbage collection operation in a flash memory and related memory device.

2. Description of the Prior Art

Due to the nature of flash memory, the flash memory does not support overwrite operations. When new data needs to replace older data already stored in the flash memory, the new data will be written to a new location and the data in the old location becomes invalid. Thus, the amount of invalid data will increase as overwriting of older data has been repeated. To ensure enough amount of the storage area in which data can be stored, invalid data in the flash memory needs to be erased. Typically, the flash memory relies on a garbage collection (GC) operation to free space occupied by the invalid data.

The GC operation selects a source block from the flash memory and only copies valid pages (i.e., pages with valid data) from the source blocks to a destination block. After all valid pages have been copied to the destination block, the selected source block can be erased and thus turn into a spare block to which data can be written.

As the GC operation is an internal behavior of the flash memory device, a memory controller needs to concurrently transfer of valid data based on the GC operation as well as handle writing of user data based on host commands. This means once the GC operation starts, the writing based on the host commands will be restricted and lead to instability of the response time to the host commands and even deterioration in the write performance of the flash memory. In view of above, there is a need to provide mechanisms of managing GC operation in the flash memory.

SUMMARY OF THE INVENTION

With this in mind, it is one object of the present invention to provide mechanisms of managing GC operation in a flash memory. Embodiments of the present invention determine a start timing of a GC operation based on a GC starting threshold, and adjust a GC-to-host write ratio based on a current number of spare blocks in the flash memory. In such embodiments, the GC operation will be started if the current number of spare blocks in the flash memory is lower than the GC starting threshold, rather than a target spare block number that is maintained by a flash translation layer (FTL) of the flash memory. This can prevent GC operations from being started and ended frequently, so as not to cause significant changes in the response time to the host commands. Embodiments of the present invention also determine a GC-to-host base ratio according to an overall valid page percentage regarding a source block and one or more candidate source blocks. In such embodiments, as the one or more candidate source blocks are taken into consideration, changes in valid page percentages among different source blocks will be smoothed. Therefore, change of the GC-to-host base ratio and the GC-to-host write ratio will be more gradual, thereby to make the response time to the host commands more stable. Embodiments of the present invention also estimate an overall spare area of the flash memory in smaller units. In such embodiments, the spare area of the flash memory could be estimated in smaller units (e.g. 4K bytes), rather than units of a block. As changes of the spare area is reflected in smaller units, the GC-to-host write ratio, which is typically associated with a size of the spare area, can be adjusted in a more subtle way, so as not to cause significant changes in the response time to the host commands.

According to one embodiment, a method of managing a GC operation on a flash memory is provided. The method comprises: selecting a source block and at least one candidate source block from the flash memory; calculating an overall valid page percentage according to a number of valid pages in the source block and the at least one candidate source block; determining a GC-to-host base ratio according to the overall valid page percentage; and performing the GC operation on the source block according to at least the GC-to-host base ratio.

According to one embodiment, a controller for use in a flash memory to control the flash memory and manage a GC operation on the flash memory is provided. The controller comprises: a storage unit and a processing unit. The storage unit is arranged to store information. The processing unit is arranged to execute program codes and information stored in the flash memory or in the storage unit so as to perform following operations of: selecting a source block and at least one candidate source block from the flash memory; calculating an overall valid page percentage according to a number of valid pages in the source block and the at least one candidate source block; determining a GC-to-host base ratio according to the overall valid page percentage; and performing the GC operation on the source block according to at least the GC-to-host base ratio.

According to one embodiment, a storage system is provided. The storage system comprises a flash memory and a controller. The controller is utilized for controlling the flash memory and managing a garbage collection (GC) operation on the flash memory. The controller is arranged to: select a source block and at least one candidate source block from the flash memory; calculate an overall valid page percentage according to a number of valid pages in the source block and the at least one candidate source block; determine a GC-to-host base ratio according to the overall valid page percentage; and perform the GC operation on the source block according to at least the GC-to-host base ratio.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Overview

Figure 1:
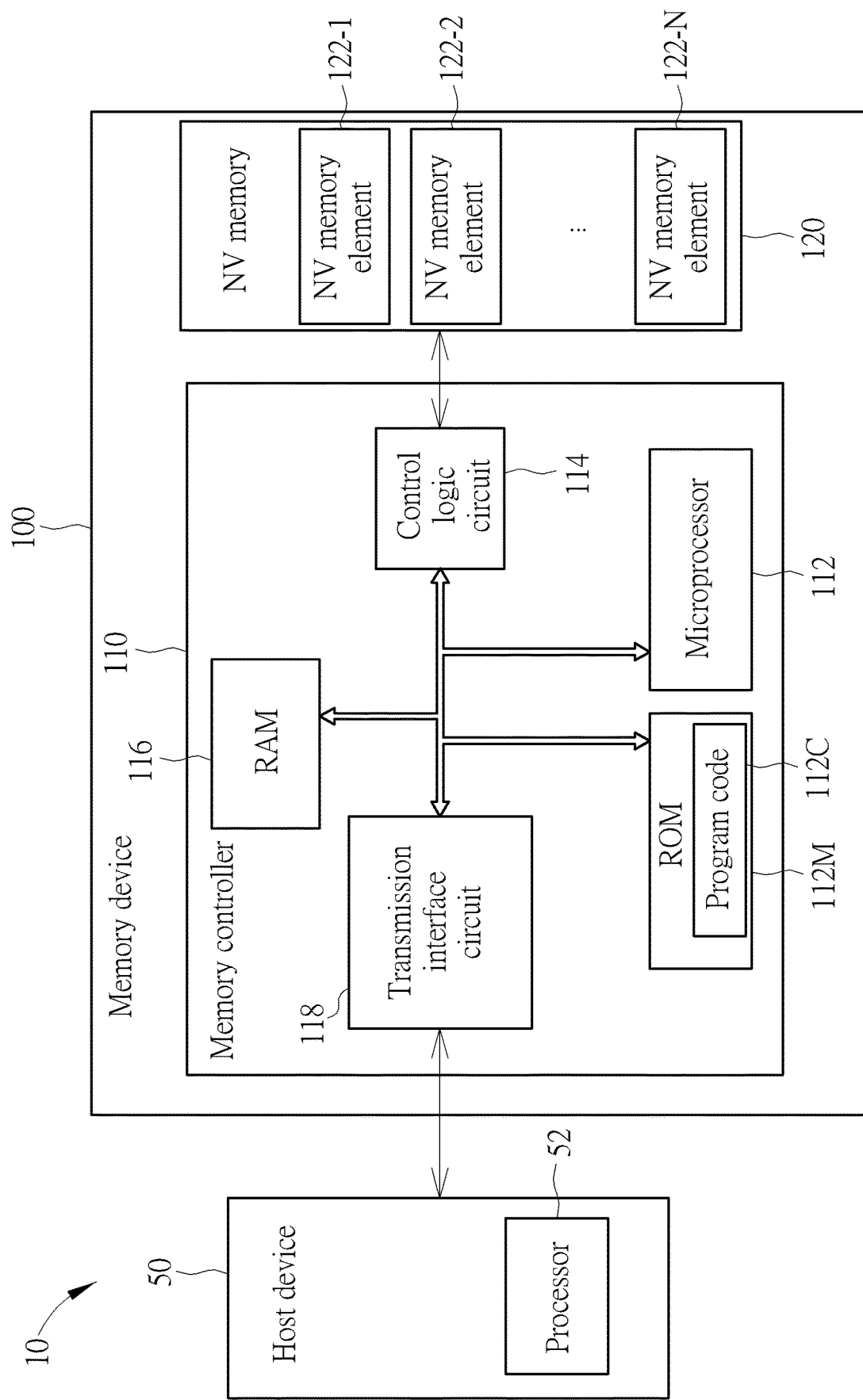
FIG. 1 illustrates a block diagram of a memory device according to one embodiment of the present invention.

FIG. 1 is a diagram illustrating an electronic device 10 according to an embodiment of the present invention, where the electronic device 10 comprises a host device 50 and a memory device 100. The host device 50 may comprise: at least one processor 52, arranged to control operations of the host device 50. Examples of the host device 50 may include, but are not limited to: a smartphone, a tablet computer, a wearable device, a personal computer such as a desktop computer and a laptop computer, an imaging device such as a digital still camera or a video camera a game console, a car navigation system, a printer, a scanner or a server system. Examples of the memory device 100 may include, but are not limited to: a portable memory device (such as a memory card conforming to SD/MMC, CF, MS, XD or UFS specifications), a solid state drive (SSD) and various embedded storage device (such as an embedded storage device conforming to UFS or EMMC specifications).

According to various embodiments, the memory device 100 may comprise a controller such as a memory controller 110, and may further comprise a non-volatile (NV) memory 120. The NV memory 120 is arranged to store information. The NV memory 120 may comprise at least one NV memory element (e.g. one or more NV memory elements), such as a plurality of NV memory elements 122_1-122_N. For example, the NV memory 120 may be a flash memory, and the NV memory elements 122_1-122_N may be a plurality of flash memory chips or a plurality of flash memory dies, respectively, but the present invention is not limited thereto. In addition, the NV memory 120 may comprise memory cells having a two-dimensional structure or may comprise memory cells having a three-dimensional structure.

As shown in FIG. 1, the memory controller 110 may comprise a processing circuit such as a microprocessor 112, a storage component such as a read-only memory (ROM) 112M, a control logic circuit 114, a garbage collection (GC) operation management engine 115, a volatile memory 116 and a transmission interface circuit 118, where at least one portion (e.g. a portion or all) of these components maybe coupled to one another through a bus. The volatile memory 116 is implemented by a random access memory (RAM), for example, the volatile memory 116 maybe a static RAM (SRAM). The volatile memory 116 may be arranged to provide internal storage space to the memory controller 110, for example, temporarily storing information. In addition, the ROM 112M of this embodiment is arranged to store a program code 112C, and the microprocessor 112 is arranged to execute the program code 112C to control access of the NV memory 120. Alternatively, the program code 112C may be stored in the NV memory 120.

The memory controller 110 controls reading, writing and erasing of the NV memory 120 through a control logic circuit 114. In addition, the memory controller 110 could perform writing of user data based on host commands from the host device 50 and writing of valid data which is read from the NV memory 120 by the garbage collection concurrently. The control logic circuit 114 maybe further arranged to control the NV memory 120 and comprise an Error Correction Code (ECC) circuit (not shown), to perform data protection and/or error correction, but the present invention is not limited thereto. The transmission interface circuit 118 may conform to a specific communications specification (such as Serial Advanced Technology Attachment (SATA) specification, Universal Serial Bus (USB) specification, Peripheral Component Interconnect Express (PCIE) specification, embedded Multi Media Card (eMMC) specification, or Universal Flash Storage (UFS) specification) and may perform communications with the host 50 according to the specific communications specification.

Typically, the host device 50 may access the memory device 100, indirectly, through transmitting host commands and corresponding logic addresses to the memory controller 110. The memory controller 110 receives the host commands and the logic addresses, and translates the host commands to memory operation commands, and further controls the NV memory 120 with the memory operation commands to perform read, write or erase operations upon memory units or data pages having physical addresses within the NV memory 120, where the physical addresses corresponds to the logic addresses. When the memory controller 110 performs an erase operation on any NV memory element 122_k within the plurality of NV memory elements 122_1-122_N, at least one block of the NV memory element 122_k may be erased. In addition, each block of the NV memory element 122_k may comprise multiple pages, and an access operation (e.g. read or write) may be performed on one or more pages.

GC Operation Start Timing and Ratio Adjustment

Embodiments of the present invention provide mechanisms of determining a start timing of GC operation on the NV memory 120 and a GC-to-host write ratio regarding how the memory controller 110 handles writing of valid data as well as writing of user data during a certain period.

Typically, flash translation layer (FTL) functions of the memory device 100 that are implemented on the memory controller 110 will maintain a minimum number of spare blocks (i.e. a target spare block number) in the NV memory 120, thereby to guarantee that there will be always sufficient spare blocks that can be allocated by memory controller 110, such as, bad block replacement. A conventional memory controller usually starts the GC operation if it is detected the current number of spare blocks is lower than the target spare block number. In such case, once the current number of the spare blocks is close to the target spare block number, the memory controller may frequently start and end the GC operation, which could lead to a significant change in the response time to the host commands, affecting the write performance of the flash memory.

In view of this, the memory controller 110 of the present invention will set a GC starting threshold that is different from the target spare block number maintained by the FTL of the memory device 100. The memory controller 110 determines whether to start the GC operation according to a comparison of the current number of spare blocks with the GC starting threshold. According to various embodiments of the present invention, the GC starting threshold is higher than the target spare block number maintained by the FTL. Thus, the memory controller 110 could start the GC operation even if the current number of spare blocks in the NV memory 120 is still higher than target spare block number.

Moreover, as the memory controller 110 concurrently handles writing of valid data based on GC operation as well as writing of user data based on the host commands, the memory controller 110 will determine a GC-to-host write ratio GHWR and perform. the GC operation according to the GC-to-host write ratio GHWR. The GC-to-host write ratio GHWR represents a ratio of a write amount of valid data based on the GC operation to a write amount of user data based on host commands sent from the host device 50 during a certain period. As such, a balance between maintaining the number of spare blocks and maintaining the write performance of the memory device 100 can be achieved.

In embodiments of the present invention, the memory controller 110 determines the GC-to-host write ratio GHWR according to a GC-to-host base ratio BR and an adjustment factor K, where GHWR=K*BR. The GC-to-host base ratio BR is determined according to a valid page percentage P of a source block, where the GC-to-host base ratio BR can be obtained by: BR=P/(1−P). The valid page percentage P of a source block indicates a ratio of the number of valid pages in the source block to the number of all the pages in the source block. The GC-to-host base ratio BR reflects a minimum requirement of the write amount based on the GC operation, and indicates how much valid data needs to be moved by the GC operation to balance the writing of host commands, in order to maintain the current number of spare blocks in the NV memory 120.

The adjustment factor K is determined based on the current number of spare blocks CN and have a negative correlation with the current number of spare blocks CN. Due to the adjustment factor K, the GC-to-host write ratio GHWR will have an increase as the current number of spare blocks decreases. Therefore, the memory controller 110 will perform more writing of valid data based on the GC operation to the destination block if the spare blocks in the NV memory 120 are not sufficient. On the other hand, the memory controller 110 will perform more writing of user data based on the host commands if the spare blocks in the NV memory 120 are sufficient.

Figure 2:
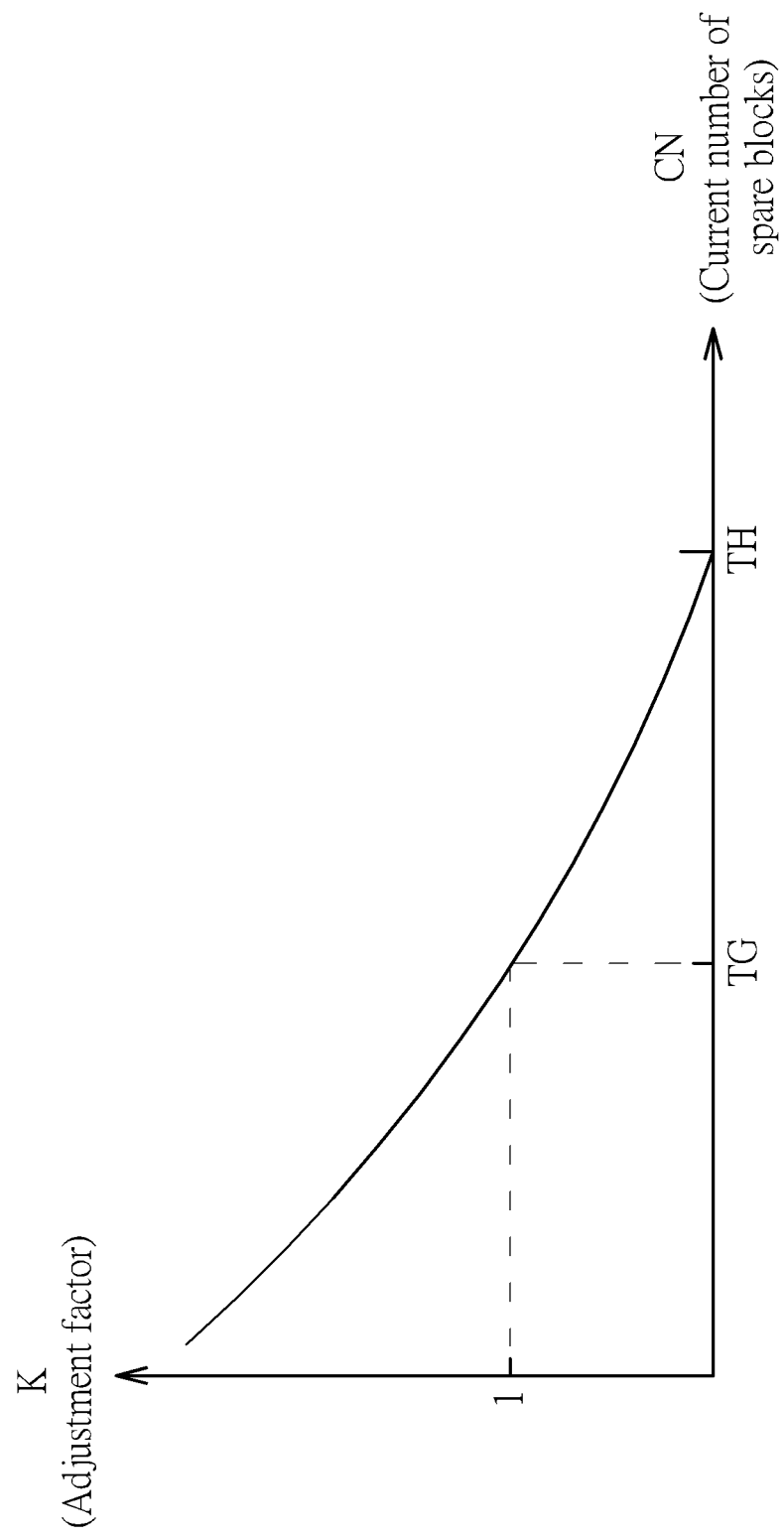
FIG. 2 illustrates a relationship between a current number of spare blocks, a target spare block number, an adjustment factor and a GC starting threshold according to a first embodiment of the present invention.

Please refer to FIG. 2, which illustrates a relationship between the current number CN of spare blocks, the target spare block number TG, the GC starting threshold TH and the adjustment factor K according to a first embodiment of the present invention. In the first embodiment, when the current number CN of spare blocks is reduced to be lower than the GC starting threshold TH, the memory controller 110 will start the GC operation. If the current number CN of spare blocks is equal to the GC starting threshold TH, the adjustment factor K will be zero. Before the current number CN of spare blocks reaches the target block number TG, the GC-to-host write ration GHWR remain lower than the GC-to-host base ratio BR. Accordingly, the memory controller 110 will not perform too much writing of valid data based on the GC operation, which leads to a decrease in the current number CN of spare blocks.

Once the current number CN of the spare blocks is reduced to the target spare block number TG, the adjustment factor K is increased to 1. At this time, the GC-to-host write ration GHWR is equal to the GC-to-host base ratio BR, which can meet the minimum requirement of the write amount of the GC operation. After the current number CN of the spare blocks is smaller than the target number of spare blocks, the adjustment factor K will be larger than 1. This means the GC-to-host write ratio GHWR will be larger than the GC-to-host base ratio BR. At this time, the memory controller 110 will perform more writing of valid data based on the GC operation, so as to free more storage area occupied by the invalid pages, causing a significant increase in the number of spare block.

Figure 3:
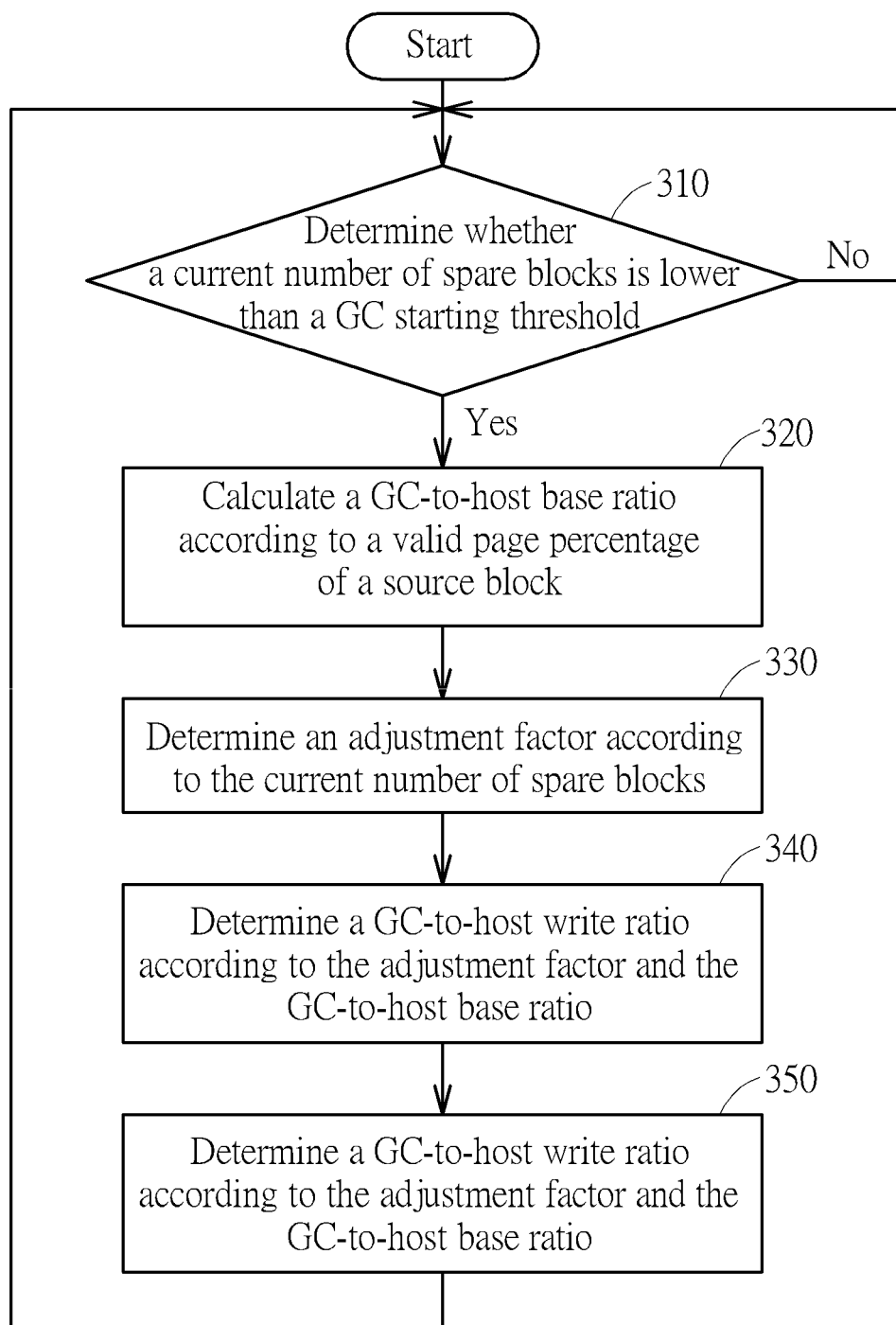
FIG. 3 illustrates a flow chart of managing a GC operation according to the first embodiment of the present invention.

FIG. 3 illustrates a flow of a method of performing a GC operation on a flash memory according to the first embodiment of the present invention. At step 310, the memory controller 110 determines whether the current number CN of spare blocks in the NV memory 120 is lower than the GC starting threshold TH, which is a predetermined spare block number and set as lower than the target spare block number TG maintained by FTL. If the memory controller 110 acknowledges that the current number CN of spare blocks in the NV memory 120 is lower than the GC starting threshold TH, the flow goes to step 320; otherwise, the flow stays at step 310. At step 320, the memory controller 110 calculates a GC-to-host base ratio BR according to a valid page percentage P of a source block. At step 330, the memory controller 110 determines an adjustment factor K according to the current number CN of spare blocks, wherein the adjustment factor K and the current number CN of spare blocks have a negative correlation as shown by FIG. 2. At step 340, the memory controller 110 determines a GC-to-host write ratio GHWR for the GC operation according to the adjustment factor K and the GC-to-host base ratio BR. At step 350, the memory controller 110 performs the GC write operation (i.e., writing of valid data based on the GC operation to a destination block) according to the GC-to-host write ratio GHWR, while performing a host write operation (i.e., writing of user data based on the host commands sent by the host device 50). At step 360, the memory controller 110 ends the GC operation. Alternatively, the memory controller 110 may further check whether if the destination block to which the GC operation currently writes has been fully written (e.g. each page has been written) before ending the GC operation. If the destination block has not been fully written, the flow may go back to step 320, keeping performing the GC operation.

Figure 4:
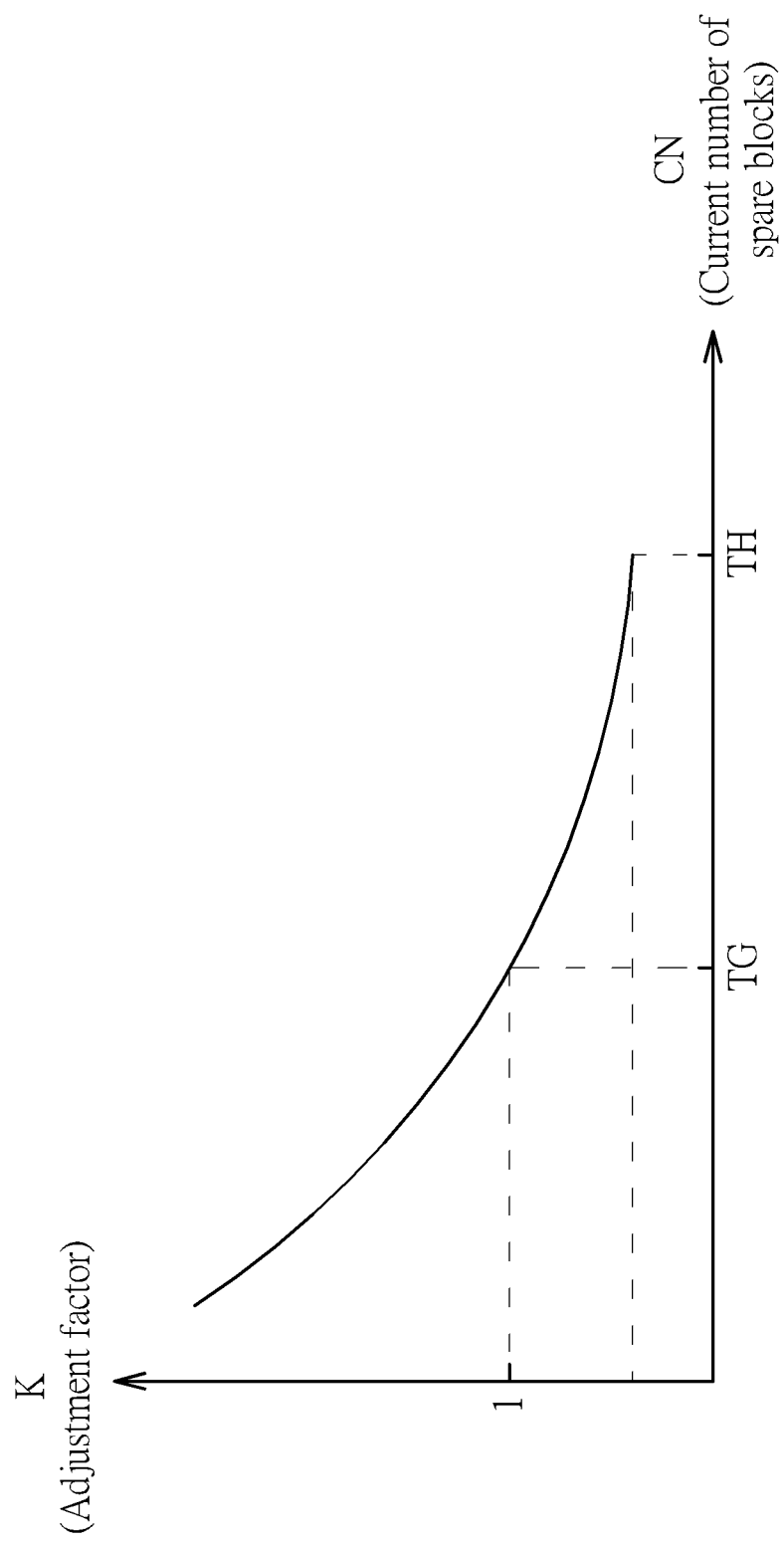
FIG. 4 illustrates a relationship between a current number of spare blocks, a target spare block number, an adjustment factor and a GC starting threshold according to a second embodiment of the present invention.

Please refer to FIG. 4, which illustrates a relationship between the current number CN of spare blocks, the target spare block number TG, the GC starting threshold TH and the adjustment factor K according to a second embodiment of the present invention. In the second embodiment, the memory controller 110 determines to start the GC operation once the current number CN of spare blocks is lower than the GC starting threshold TH. Also, the adjustment factor K and the current number CN of spare blocks still have a negative correlation. The difference between the first embodiment and the second embodiment is that the adjustment factor K will be a non-zero value (i.e., larger than zero but smaller than 1) when GC operation starts. In addition, as the flow of managing the GC operation according to the second embodiment is similar to that of the first embodiment, detailed flow chart is not illustrated for the sake of brevity.

Figure 5:
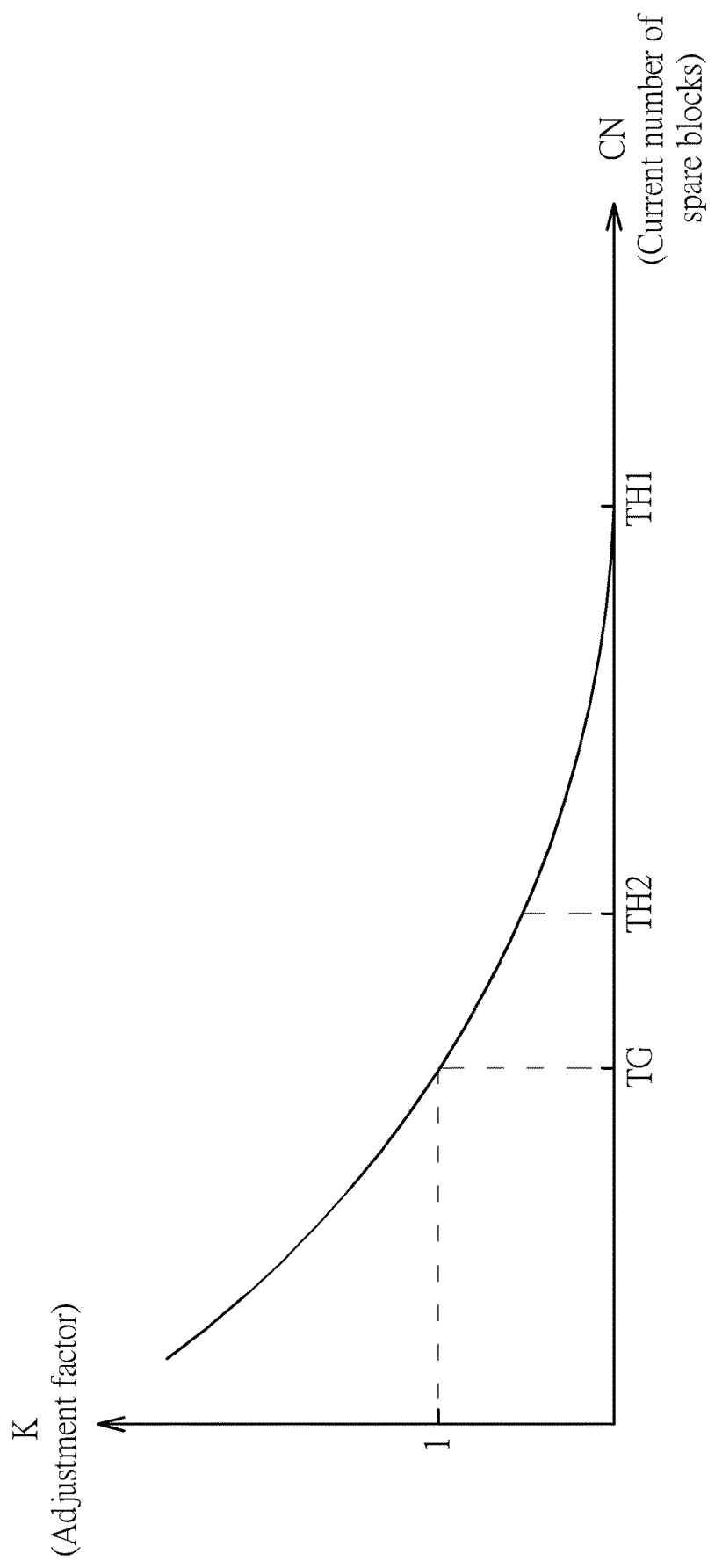
FIG. 5 illustrates a relationship between a current number of spare blocks, a target spare block number, an adjustment factor and a GC starting threshold according to a third embodiment of the present invention.

Please refer to FIG. 5, which illustrates a relationship between the current number CN of spare blocks, the target spare block number TG, the GC starting threshold TH2, the GC ending threshold TH1 and the adjustment factor K according to a third embodiment of the present invention. In the third embodiment, when the current number CN of spare blocks is reduced to lower than the GC starting threshold TH2, the memory controller 110 determines to start the GC operation. At this time, the adjustment factor K will be a non-zero value (i.e., larger than zero but smaller than 1). Hence, the memory controller 110 will not perform too much writing of valid data based on the GC operation. As the current number of spare blocks decreases, the adjustment factor K increases. Once the current number CN of the spare blocks is equal to the target spare block number TG, the adjustment factor K is increased equal to 1. After the current number CN of the spare blocks is smaller than the target spare block number TG, the adjustment factor K will be larger than 1, which cause the memory controller 110 to perform more writing of valid data based on the GC operation. On the other hand, only if the current number of spare blocks is increased to the GC ending threshold TH1, the memory controller 110 determines to end the GC operation. At this time, the adjustment factor K will be zero. The difference between this embodiment and the previous embodiments is that the memory controller 110 relies on the GC ending threshold TH1 that is higher than the GC starting threshold TH2 to determine whether to end the GC operation, while relying on the GC starting threshold TH1 to determine whether to start the GC operation.

Figure 6:
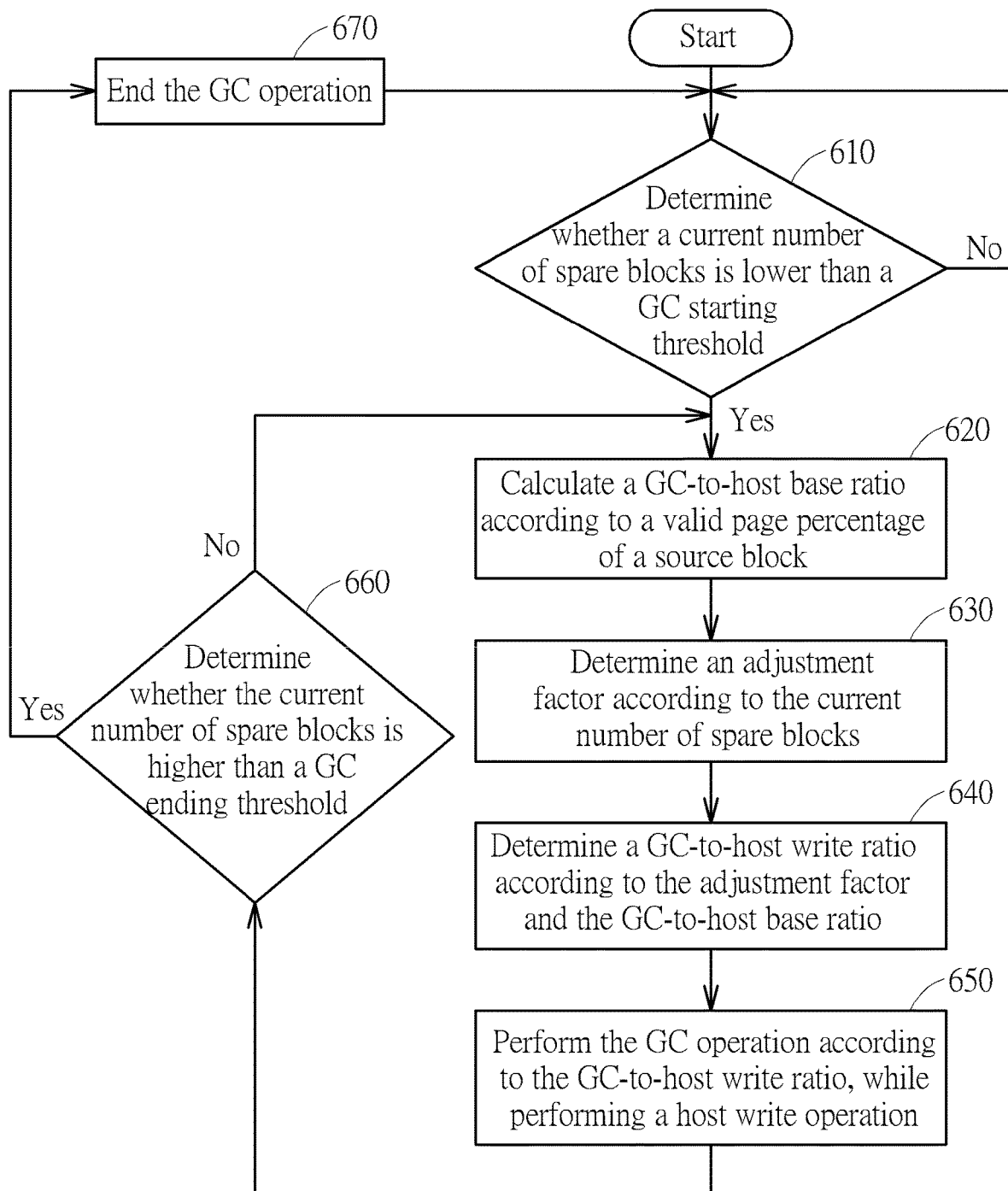
FIG. 6 illustrates a flow chart of managing a GC operation according to the third embodiment of the present invention.

FIG. 6 illustrates a flow of a method of managing a GC operation on a flash memory according to the third embodiment of the present invention. At step 610, the memory controller 110 determines whether a current number CN of spare blocks in the NV memory 120 is lower than a GC starting threshold TH2. If the memory controller 110 acknowledges that the current number CN of spare blocks in the NV memory 120 is lower than the GC starting threshold TH2, the flow goes to step 620; otherwise, the flow stays at step 610. At step 620, the memory controller 110 calculates a GC-to-host base ratio BR according to a valid page percentage P of a source block. At step 630, the memory controller 110 determines an adjustment factor K according to the current number CN of spare blocks according to the relationship illustrated by FIG. 5. At step 640, the memory controller 110 determines a GC-to-host write ratio GHWR according to the adjustment factor K and the GC-to-host base ratio BR. At step 650, the memory controller 110 performs the GC write operation (i.e., writing of valid data based on the GC operation to a destination block) according to the GC-to-host write ratio GHWR, while performing a host write operation (i.e., writing of user data based on the host commands sent by the host device 50). At step 660, the memory controller 110 determines whether the current number CN of spare blocks is higher than a GC ending threshold TH1. If yes, the flow goes to step 670, ending the GC operation; otherwise, the flow returns back to step 620, keeping performing the GC operation. At step 670, the memory controller 110 ends the GC operation. Alternatively, the memory controller 110 may further check whether if the destination block to which the GC operation currently writes has been fully written (e.g. each page has been written) before ending the GC operation. If the destination block has not been fully written, the flow may go back to step 620, keeping performing the GC operation.

In summary, embodiments of the present invention provide methods for determining the GC start timing and the GC-to-host write ratio, where the present invention sets a GC starting threshold TH (or TH2) higher than the target spare block number TG, and dynamically adjusting the GC-to-host write ratio GHWR according to the current number CN of spare blocks. When the GC operation is just started, the memory controller 110 will not perform too much writing of valid data based on the GC operation. Until the current number CN of spare blocks is lower than the target spare block number TG, the memory controller 110 will perform a considerable amount of writing of valid data based on the GC operation. In view of this, the present invention can prevent the GC operation from being frequently started and ended, thereby making the response time to the host commands more stable.

Base Ratio Determination

Embodiments of the present invention provide mechanisms of determining a GC-to-host base ratio. According to various embodiments of the present invention, the GC-to-host base ratio is calculated based on an overall valid page percentage, where the overall valid page percentage is determined according to the number of valid pages in a source block to which the GC operation currently moves the valid data as well as the number of valid pages in one or more candidate source blocks.

Typically, a valid page percentage of a source block is related to the amount of valid data the memory controller writes to the destination block during the GC operation. Therefore, the GC-to-host base ratio and the GC-to-host write ratio will vary when the GC operation is performed on different source blocks. Once the source block is switched from one to another, there may be a significant change in the response time to the host commands and a potential deterioration in the write performance of the flash memory.

In order to solve such problem, embodiments of the present invention takes one or more candidate source blocks into consideration in calculating the valid page percentage. Specifically, the memory controller 110 could select one or more candidate source blocks, while determining a source block for the GC operation. The source block could be selected by the memory controller 110 according to specific policy. For instance, one block may be selected as the source block if it has the most invalid pages. According to such policy, the memory controller 110 may select the candidate source blocks from those blocks having the second most, the third most, . . . , and the Nth most invalid pages. In other words, those blocks with invalid pages more than other blocks may be selected as the candidate source blocks. Please note that, such policy is not intended to limit the present invention in scope. According to various embodiments of the present invention, there could be other factors taken into consideration in selecting the one or more candidate source blocks.

Once the source and candidate source blocks have been selected, the memory controller 110 could determine the overall valid page percentage P based on the number of valid pages in the source block and in the candidate source blocks in different manners according to various embodiments of the present invention.

In a fourth embodiment of the present invention, the overall valid page percentage P could be calculated by averaging a valid page percentage p0 of the source block b0 and valid page percentages p1-pk of the candidate source blocks b1-bk, where k is an number of the candidate source blocks and could be any integer larger than 1. Thus, the memory controller 110 determines the overall valid page percentage P according to:

$$P=(p0+p1+ \ldots +pk)/(k+1)$$

Figure 7A:
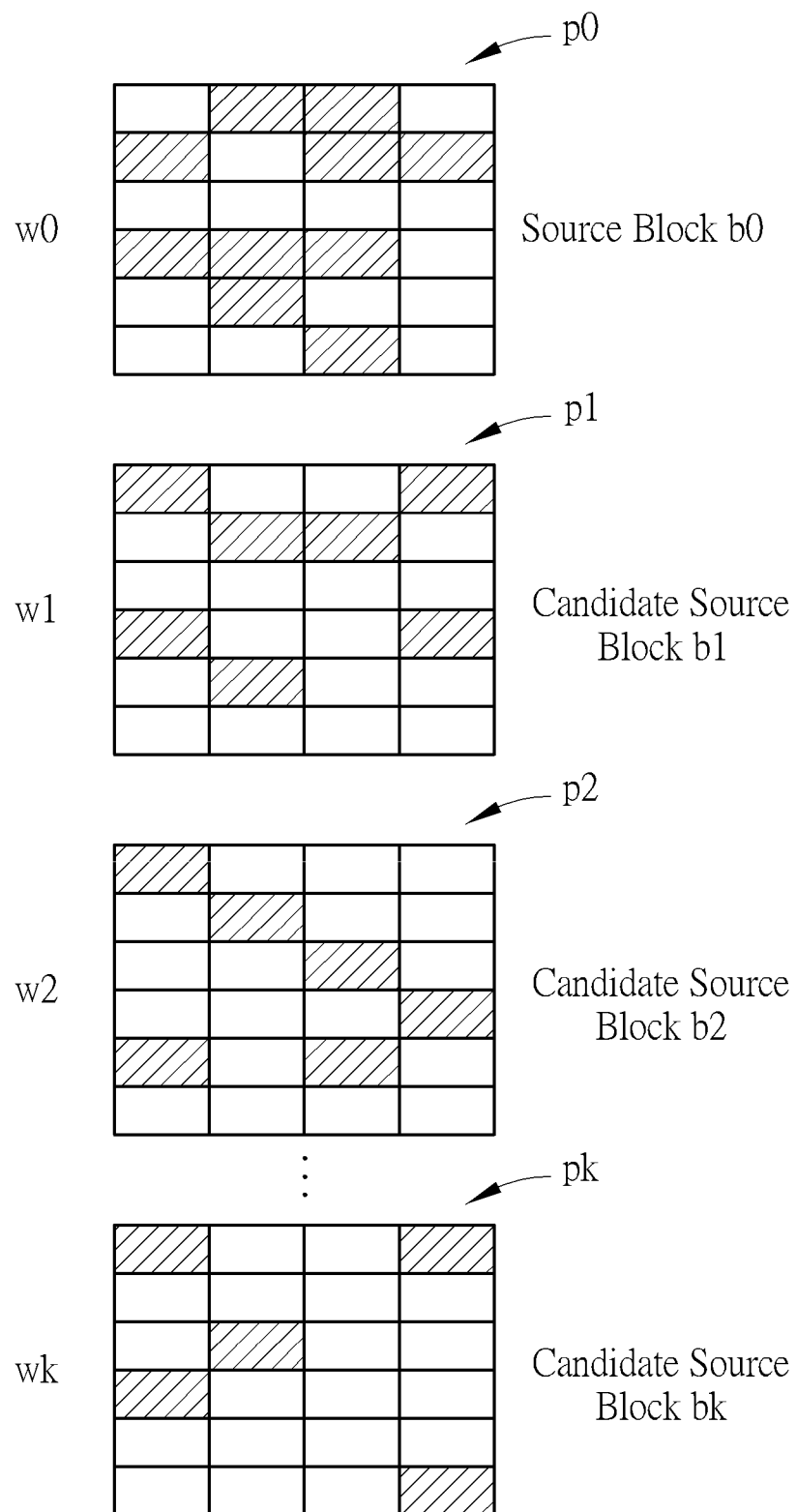
FIGS. 7A-7D illustrate how to determine an overall valid page percentage according to various embodiments of the present invention.

In a fifth embodiment of the present invention as illustrated by FIG. 7A, the overall valid page percentage P could be obtained by calculating a weighted average of a valid page percentage p0 of the source block b0 and valid page percentages p1-pk of the candidate source blocks b1-bk. In such embodiment, the memory controller 110 further determines a weight w0 for the source block b0 and weights w1-wk for the candidate source blocks b1-bk. In a preferred embodiment, the weight w0 could be larger than the weights w1-wk and the summation of the weights w0-wk will be 1. In view of this, the memory controller 110 determines the overall valid page percentage P according to:

$$P=w0*p0+w1*p1+ \ldots +wk*pk$$

In such embodiment, the weight for a block is associated with the number of invalid pages in the block. For example, if the numbers of invalid pages n1-n3 in the candidate source blocks b1-b3 have a relationship of n1>n2>n3, the weights w1-w3 for the candidate source blocks b1-b3 will have a relationship of w1>w2>w3. Moreover, if the memory controller 110 has finished moving data in the valid pages of the source block b0 to a destination block and continues to move data in the valid pages of the source block b1 to the destination block, the memory controller 110 may re-select candidate source blocks. At the time, the re-selected candidate source blocks may be identical to or different from the previously selected candidate source blocks b2-bk. This is because the number of invalid pages in a block varies all the time due to other mechanisms implemented on the memory controller 110. In addition, if the memory controller 110 has finished moving data in the valid pages in the source block b0 to the destination block, the memory controller 110 may re-select a block instead of using the first one of the candidate source block b1 as the following source block.

In a sixth embodiment of the present invention, the overall valid page percentage P could be calculated by performing a moving average calculation according to the number of valid pages in the source block and the candidate source blocks b1-b3. Please note that, the number of the candidate source blocks here is not a limitation of the present invention.

Figure 7B:
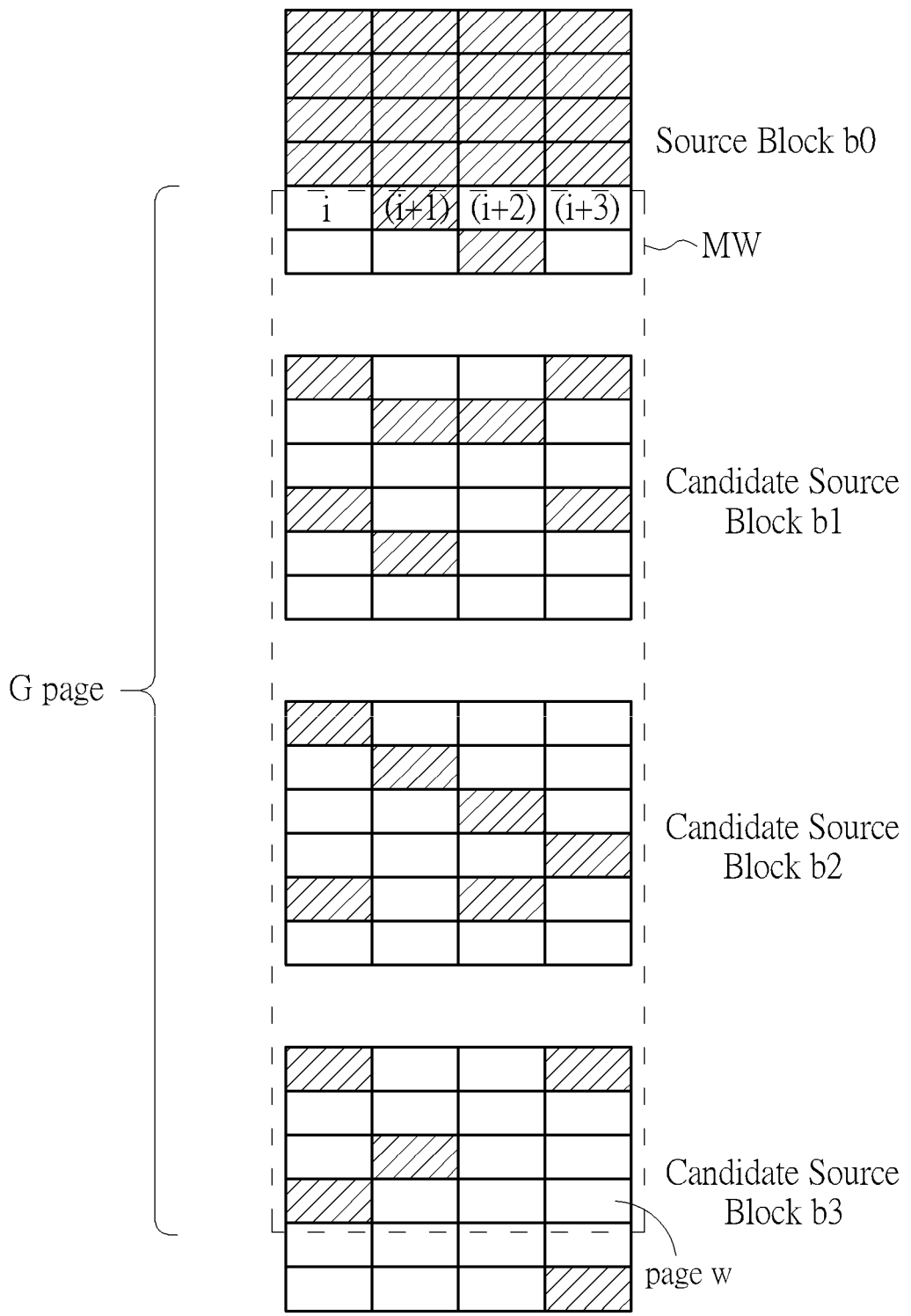
Figure 7C:
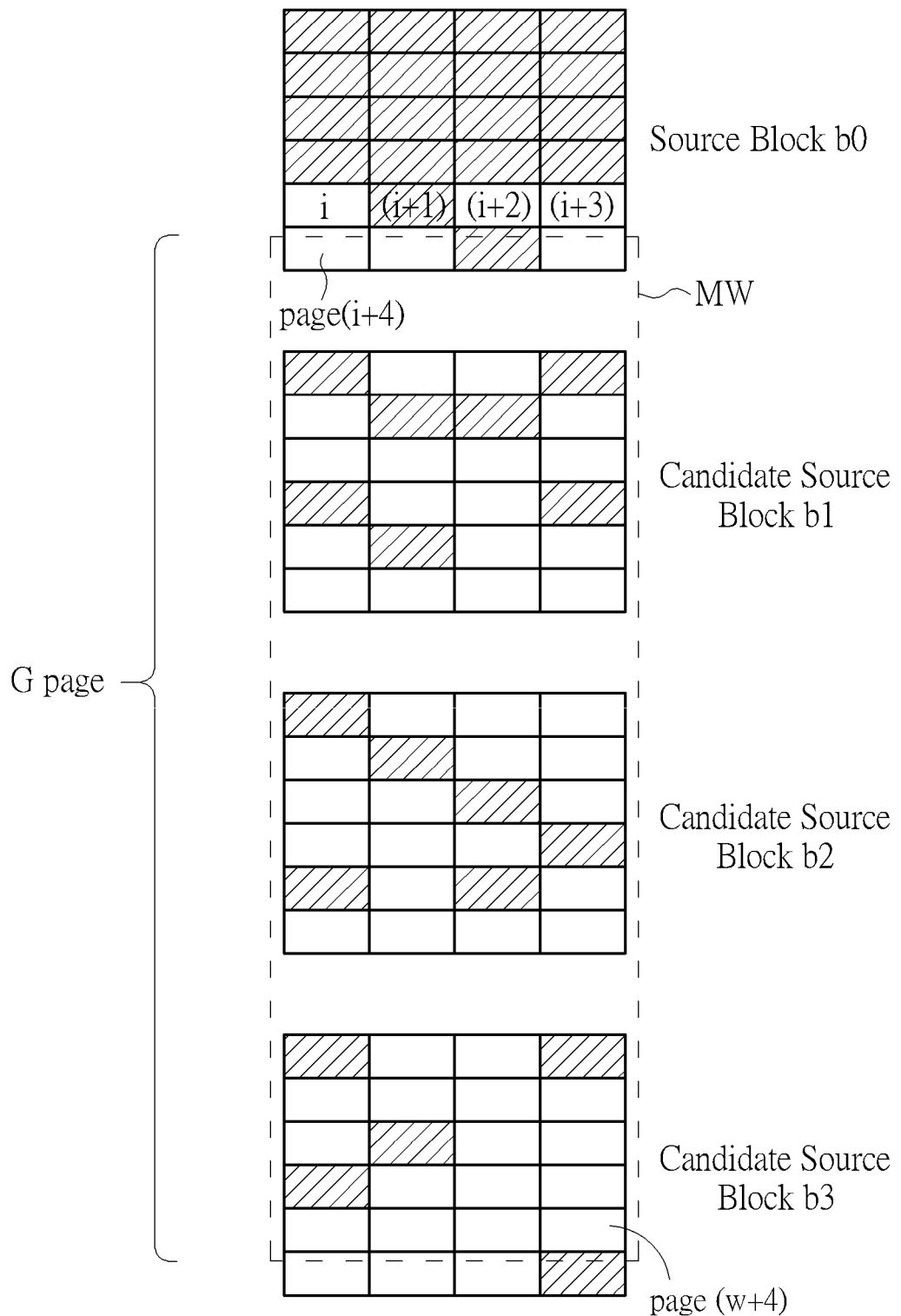
Figure 7D:
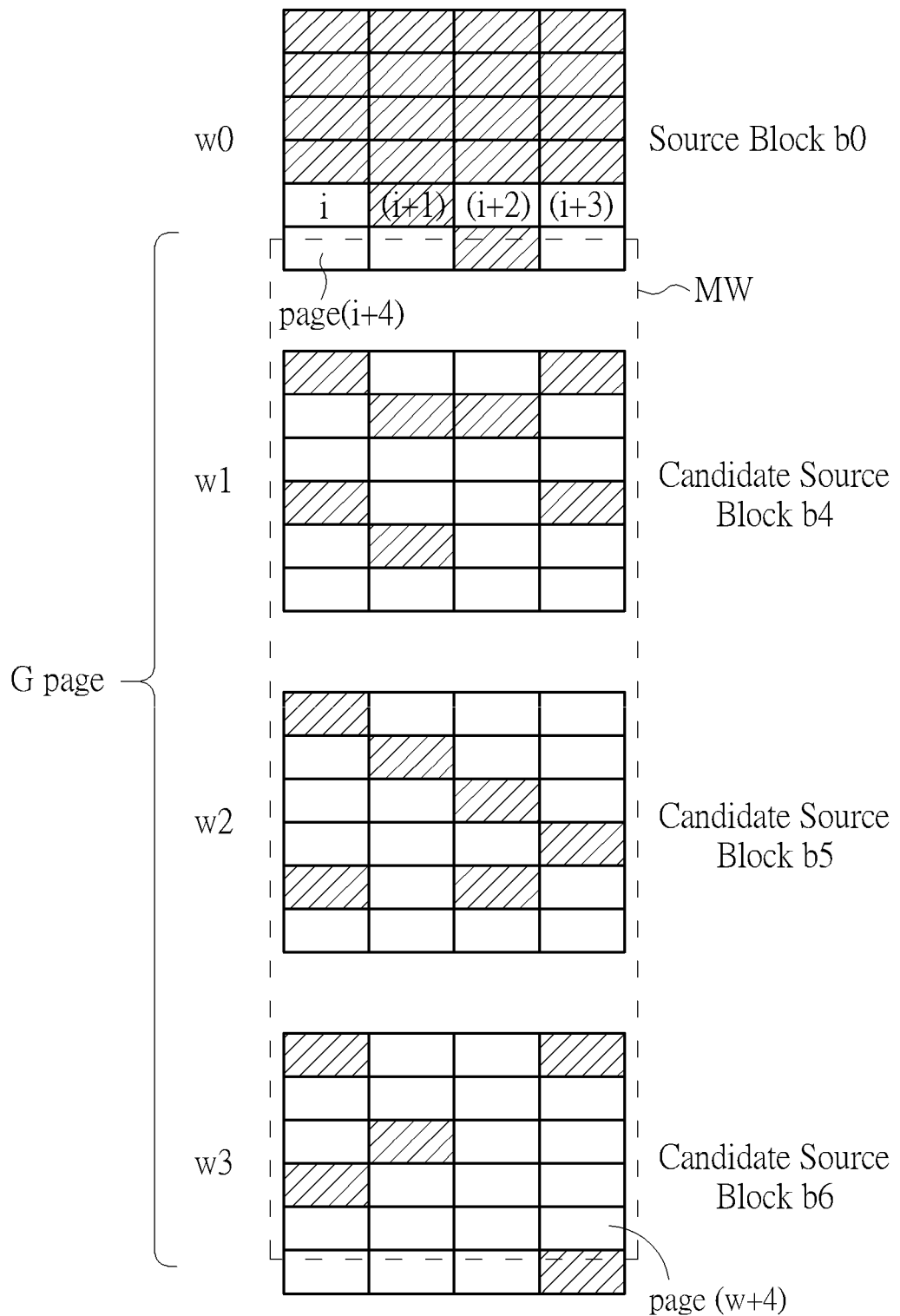

Please refer to FIGS. 7B-7D for further details. FIG. 7B illustrates a source block b0 and candidate source block b1-b3, where shadow cells in the blocks represents an invalid page, while white cells in the blocks represents a valid page. A moving window MW selects the predetermined number of pages (e.g. G pages) among the source block b0 and candidate source blocks b1-b3 that have not been processed by the GC operation. Specifically, a selection range of the moving window MW starts at a page i in the source block b0 and ends at a page w in the candidate source block b3. Accordingly, the memory controller 110 determines the overall valid page percentage P according to a ratio of the number of valid pages in the moving window MW to the total page number G in the moving window MW. As illustrated by FIG. 7B, the memory controller 110 determines the overall valid page percentage P as:

$$P=(6+17+18+12)/24*3$$

In one embodiment, the memory controller 110 may re-determine the overall valid page percentage P of the source block b0 and the candidate source blocks b1-b3 anytime during the GC operation. For example, as shown by FIG. 7C, after the pages i– page (i+3) in the source block b0 has been processed by the GC operation (; wherein data in the pages i, (i+2) and (i+3) of the source block b0 have been moved to the destination block), the memory controller 110 could re-determine the overall valid page percentage P. At this time, the moving window MV moves down to select pages that have not been processed, where the selection range will start at page (i+4) in the source block b0 and end at page (w+4) in the candidate source block b3. Accordingly, the memory controller 110 will re-determine the overall valid page percentage P according to the number of valid pages in the G pages selected by the moving window MV.

According to various embodiment of the present invention, the memory controller 110 could re-select the candidate source blocks while re-determining the overall valid page percentage P. Please refer to FID. 7D for further details. After the GC operation has processed several pages in the source block b0, the memory controller 110 could re-determine the overall valid page percentage P. As shown by FIG. 7D, the memory controller 110 could re-select the candidate source blocks (i.e., blocks b4-b6) and re-determine the overall valid page percentage P according to the number of valid pages in the G pages selected by the moving window MV among the source block b0 and the candidate source blocks b4-b6. In one embodiment, when determining the overall valid page percentage P in the pages selected by the moving window MW, the memory controller 110 could also determine weights for the number of valid pages in different blocks and accordingly calculates the overall valid page percentage P. For example, a weight w0 for the number of valid pages in the source block b0, weights w1-w3 for the number of valid pages in the candidate source blocks b4-b6.

Once the overall valid page percentage P is calculated by the memory controller 110, the memory controller 110 could perform the GC operation accordingly. The memory controller 110 could determine an adjustment factor K according to the current number CN of spare blocks in the NV memory 120. Also, the memory controller 110 could calculate the GC-to-host base ratio BR according to the overall valid page percentage P. Finally, the memory controller 110 determines the above-mentioned GC-to-host write ratio GHWR according to the adjustment factor K and the GC-to-host base ratio BR and thus performs the GC write operation according to the GC-to-host write ratio GHWR, while performing the host write operations.

Figure 8:
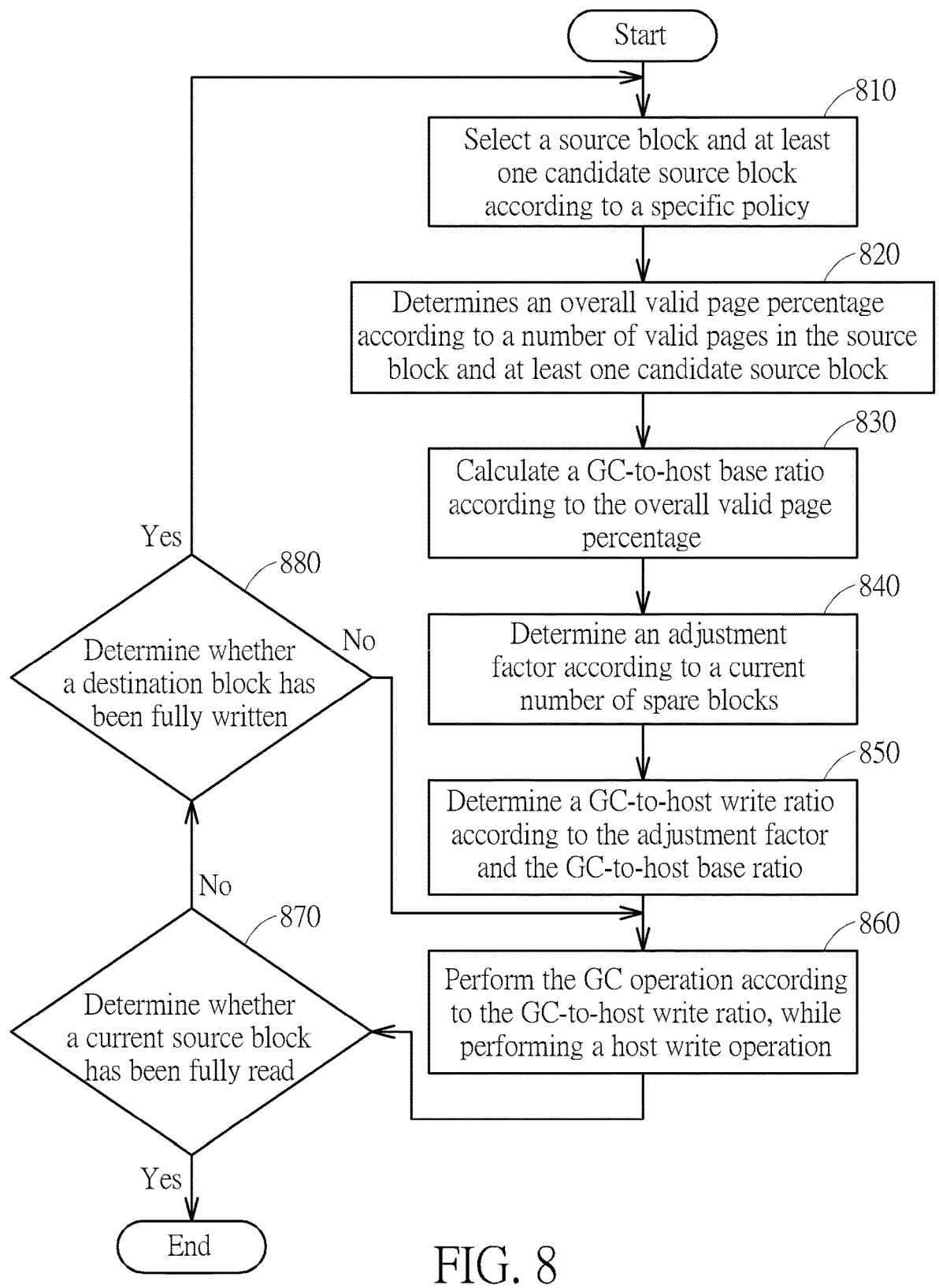
FIG. 8 illustrates a flow chart of managing a GC operation according to the fourth, fifth and sixth embodiments of the present invention.

FIG. 8 illustrates a flow of a method of managing a GC operation on a flash memory according to the fourth, fifth and sixth embodiments of the present invention. At step 810, the memory controller 110 selects a source block and at least one candidate source block from the NV memory 120 according to a specific policy, such as, the number of invalid pages in a block. At step 820, the memory controller determines an overall valid page percentage P according to the number of valid pages in the source block and at least one candidate source block. According to the above-mentioned embodiments, the overall valid page percentage P could be obtained by generic average, weighted average or moving average calculation. At step 830, the memory controller 110 calculates a GC-to-host base ratio BR according to the overall valid page percentage P, where $BR=P/(1-P)$. At step 840, the memory controller 110 determines an adjustment factor K according to the current number of spare blocks, wherein the adjustment factor K and the current number of spare blocks may have a negative correlation and may have relationships as shown in FIGS. 2, 4 and 5. At step 850, the memory controller 110 determines a GC-to-host write ratio GHWR according to the adjustment factor K and the GC-to-host base ratio BR, where the GC-to-host write ratio GHWR may be determined by: $GHWR=K*BR$. At step 860, the memory controller 110 performs the GC write operation (i.e., writing of valid data based on the GC operation to a destination block) according to the GC-to-host write ratio GHWR, while performing a host write operation (i.e., writing of user data based on the host commands sent by the host device 50). At step 870, the memory controller 110 determines whether the destination block the GC operation currently writes to has been fully written (e.g. each page has been written). If yes, the flow ends, where the memory controller 110 ends the GC operation; otherwise, the flow goes to step 880, the memory controller 110 determines whether the current source block has been fully read (i.e. each valid page has been moved to the destination block). If yes, the flow goes back to step 810, re-selecting the source block and one or more candidate source blocks; otherwise, the flow goes back to step 860, keeping performing the GC operation.

In the above-mentioned embodiments, the present invention relies on selecting one or more candidate source blocks to calculate an overall valid page percentage, so as to smooth changes in valid page percentages between different source blocks. Therefore, a sudden change in the GC-to-host base ratio BR as well as the GC-to-host write ratio GHWR can be prevented when the source block is switching from one to another. In view of this, the present invention can maintain the stability of the response time to the host commands, so as not to deteriorate the write performance of the flash memory during the GC operation.

Spare Area Estimation and Adjustment Factor Determination

Embodiments of the present invention provide mechanisms of estimating spare area of a flash memory. In such embodiments, the memory controller 110 estimates an overall spare area of NV memory unit 120 in smaller units rather than in blocks. According to various embodiments of the present invention, there are several possible areas, such as, a spare area (A) in one or more target blocks to which user data of host command (s) is written, a spare area (B) in one or more destination blocks to which the GC operation writes valid data, a spare area (C) in a source block from which the GC operation reads valid data, and a spare area (D) in spare blocks in the NV memory 120, will be taken into consideration for estimating the overall spare area of the NV memory 120.

Figure 9:
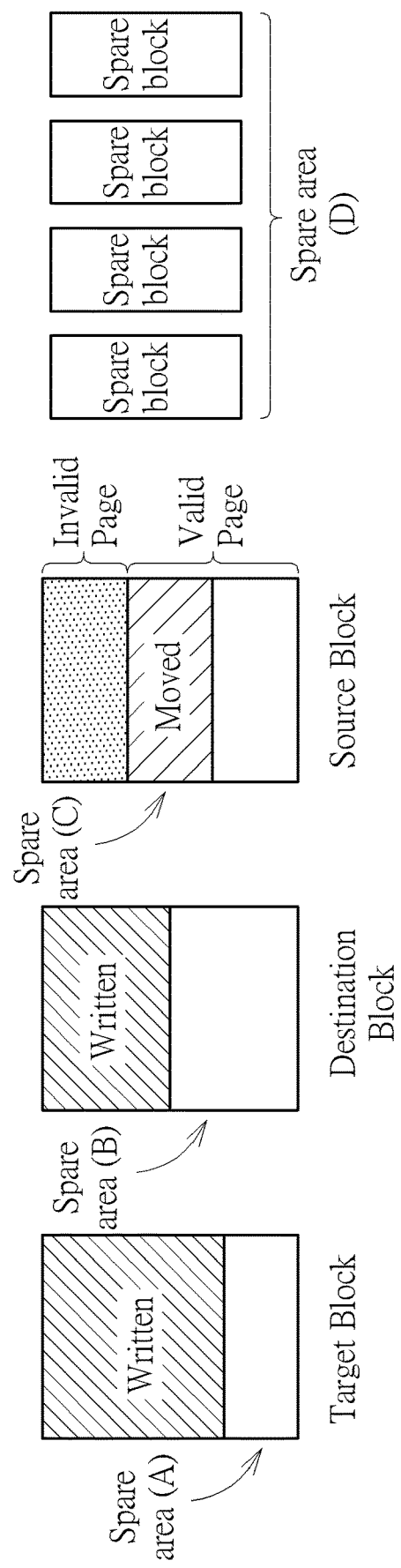
FIG. 9 illustrates spare areas in different blocks of a flash memory according to one embodiment of the present invention.

Please refer to FIG. 9 for further details. First, the spare area (A) represents logic block addresses in one or more target blocks that have not been used/written, wherein the one or more target block are blocks to which user data of the host command(s) is currently written. Second, the spare area (B) represents logic block addresses in one or more destination blocks that have not been used/written, wherein the one or more destination blocks are blocks to which valid data of the GC operation is currently written or about to be written. In some embodiments, the one or more target blocks to which the user data of the host command is currently written may be identical to the one or more destination blocks to which the GC operation currently writes valid data or is about to write valid data. Hence, the spare area (A) will be the same as the spare area (B). In some embodiments, the user data of the host command could be written to more than one target blocks at a same time. Thus, the spare area (A) will be a summation of individual spare areas in each of the target blocks to which the user data of the host command is currently written. In some embodiments, the valid data of the GC operation could be written to more than one destination blocks at a same time. Thus, the spare area (B) will be summation of individual spare areas in each of the destination blocks to which the valid data of the GC operation is currently written or is about to be written.

Third, the spare area (C) represents logic block addresses in in a source block that have read by the GC operation (i.e., a data amount have been moved to the destination block), wherein the source block is the block from which the GC operation reads the valid data. As the spare area (C) is not available for writing of new data until the source block has been erased. Therefore, the spare area (C) needs to be calculated by estimating a ratio of a data amount of data in a source block that have been copied/read by the GC operation to a valid page percentage of the source block. That is, the spare area (C) is determined by: $Moved\_D/P$, where $Moved\_D$ is a data amount of data in a source block that have been copied/read by the GC operation, and P is a valid page percentage of the source block. In some embodiments, the GC operation could read more than one source blocks at a same time. Thus, the spare area (C) will be a summation of individual spare areas in each of the source blocks from which the valid data of the GC operation is currently read. Fourth, the spare area (D) represents logic block addresses of spare blocks in the NV memory 120.

According to various embodiments, the memory controller 110 could estimate the overall spare area of a NV memory 120 with one of the following summations:
  i) spare area (A)+spare area (D)
  ii) spare area (A)+spare area (B)+spare area (D)
  iii) spare area (A)+spare area (B)+spare area (C)+spare area (D)
  iv) spare area (B)+spare area (C)+spare area (D)
  v) spare area (A)+spare area (C)+spare area (D)

Once the overall spare area of the NV memory 120 is calculated by the memory controller 110, the memory controller 110 could perform the GC operation accordingly. The memory controller 110 could determine an adjustment factor K according to the calculated overall spare area of the NV memory 120. Accordingly, the memory controller 110 determines the above-mentioned GC-to-host write ratio GHWR according to the adjustment factor K and the GC-to-host base ratio BR and thus performs the GC write operation according to the GC-to-host write ratio GHWR, while performing the host write operations.

In an extreme case, the overall spare area can be estimated in units of 4K bytes, which is significantly smaller than units of 128K or 256K bytes (e.g., a block size) that the conventional art uses to estimate the spare area in the flash memory. As changes of the spare area is reflected in smaller units, changes in the adjustment factor K become more subtle, such that the GC-to-host write ratio GHWR can be adjusted in a more refined way. In addition, the present invention can track changes in spare area each time writing based on host commands and/or GC operation is performed (e.g. spare area (A), spare area (B), and spare area (C)). Thus, the overall spare area can reflect the change in spare area of the flash memory more immediately. Accordingly, the memory controller 110 can re-determine the adjustment factor K and the GC-to-host write ratio GHWR at any time during the GC operation.

In a preferred embodiment, the memory controller 110 may determine to start the GC operation if the current number of spare blocks in the NV memory 120 is lower than or equal to the GC starting threshold that is higher than a target spare block number maintained by the FTL of the NV memory 120. Alternatively, the memory controller 110 may determine to start the GC operation only if the current number of spare blocks is lower than or equal to the target spare block number.

Figure 10:
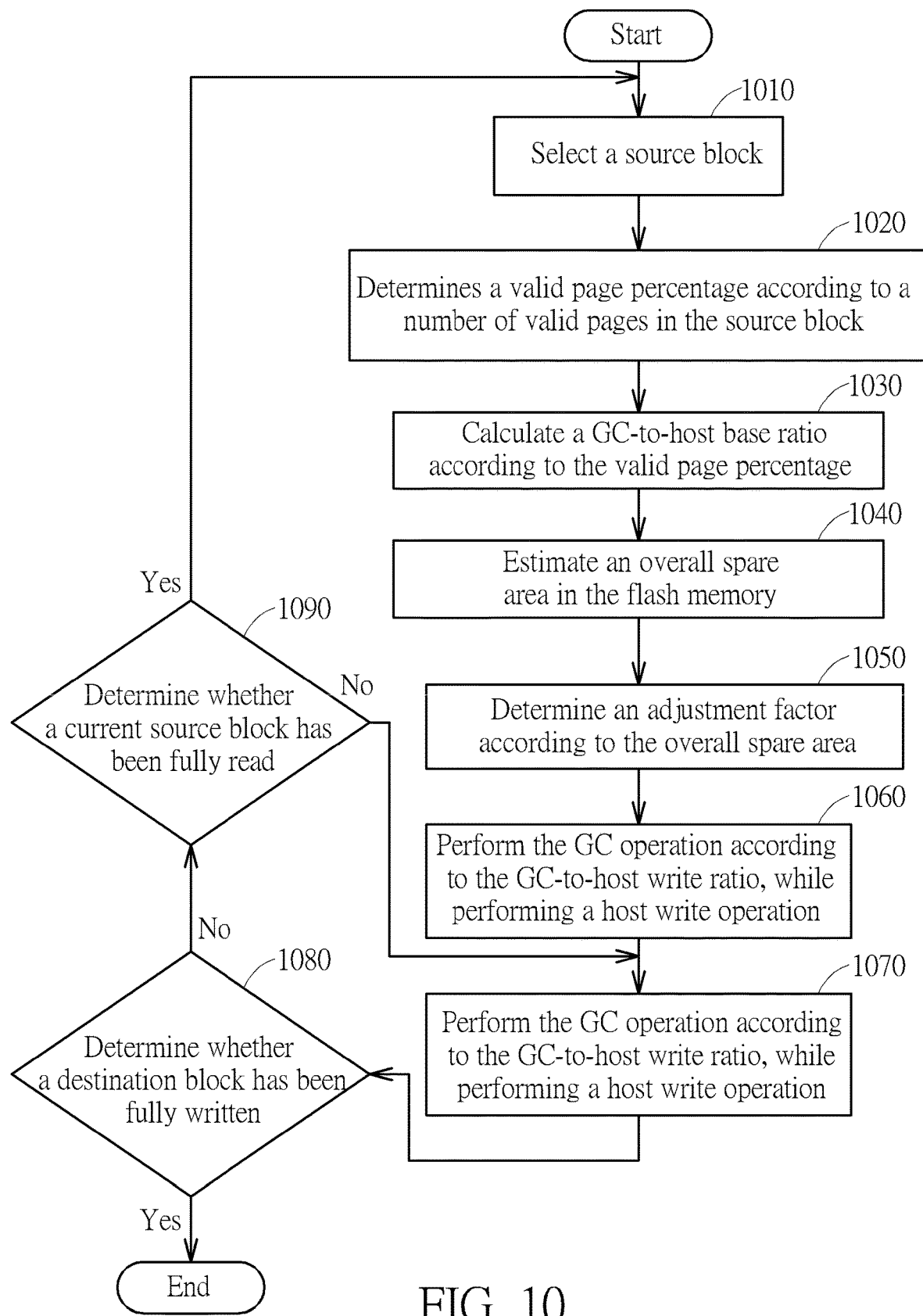
FIG. 10 illustrates a flow chart of managing a GC operation according to a seventh embodiment of the present invention.

FIG. 10 illustrates a flow of a method of managing a GC operation in a flash memory according to a seventh embodiment of the present invention. At step 1010, the memory controller 110 selects a source block from the NV memory 120 for the GC operation. At step 1020, the memory controller 110 selects determines a valid page percentage P according to a number of valid pages in the source block. At step 1030, the memory controller 110 calculates a GC-to-host base ratio BR according to the valid page percentage P, where the GC-to-host base ratio BR may be determined by: BR=P/(1−P). At step 1040, the memory controller 110 estimates an overall spare area in the NV memory 120. According to various embodiments of the present invention, the memory controller 110 could take spare areas in one or more of the target block (s) of the host command, the destination block (s) of the GC operation, the source block of the GC operation and the spare blocks in the NV memory 120 into consideration. At step 1050, the memory controller 110 determines an adjustment factor K according to the overall spare area, where the adjustment factor K and the size of the overall spare area could have a negative correlation as shown in FIGS. 2, 4 and 5. At step 1060, the memory controller determines a GC-to-host write ratio GHWR according to the adjustment factor K and the GC-to-host base ratio BR, where the GC-to-host write ratio GHWR may be determined by: GHWR=K*BR. At step 1070, the memory controller 110 performs the GC operation (i.e., writing of valid data based on the GC operation to a destination block) according to the GC-to-host write ratio GHWR, while performing a host write operation (i.e., writing of user data based on the host commands sent by the host device 50). At step 1080, the memory controller 110 determines whether the destination block the GC operation currently writes to has been fully written (e.g. each page has been written). If yes, the flow ends, where the memory controller 110 ends the GC operation; otherwise, the flow goes to step 1090, the memory controller 110 determines whether the current source block has been fully read (i.e. each valid page has been moved to the destination block). If yes, the flow goes back to step 1010, re-selecting the source block; otherwise, the flow goes back to step 1070, keeping performing the GC operation.

In the above-mentioned embodiments, the memory controller 110 estimates the overall spare area of the flash memory in smaller units. Thus, the adjustment factor K can reflect tiny changes in the spare area of the flash memory, so as to GC-to-host write ratio GHWR can be adjusted in a more subtle way, so as not to cause significant changes in the response time to the host commands. Moreover, as the estimated overall spare area can reflect the available space in the flash memory more accurately (i.e., estimated in smaller units) and instantly (i.e., estimated after each writing operation), the GC operation performed by the memory controller 110 can be more responsive to the available space in the flash memory.

Embodiments in accordance with the present invention can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of managing a garbage collection (GC) operation, comprising:
   selecting a source block and at least one candidate source block from the flash memory;
   calculating an overall valid page percentage according to a number of valid pages in the source block and the at least one candidate source block, comprising:
   determining a weight for each of the source block and the at least one candidate source block, where the weight of the source block is greater than the weight of the at least one candidate source block;
calculating a valid page percentage for each of the source block and the at least one candidate source block; and
obtaining the overall valid page percentage by calculating a weighted average of percentages of valid pages of the source block and the at least one candidate source block based on the weights of the source block and the at least one candidate source block;
determining a GC-to-host base ratio according to the overall valid page percentage; and
performing the GC operation on the source block according to at least the GC-to-host base ratio.

2. The method of claim 1, wherein the step of calculating the overall valid page percentage comprises:
calculating a valid page percentage for each of the source block and the at least one candidate source block; and
obtaining the overall valid page percentage by calculating an average of percentages of valid pages of the source block and the at least one candidate source block.

3. The method of claim 1, wherein the step of determining the weight for each of the source block and the at least one candidate source block comprises:
determining the weight for each of the source block and the at least one candidate source block according a numbers of invalid pages in each of the source block and the at least one candidate source block.

4. The method of claim 1, wherein the step of calculating the overall valid page percentage comprises:
selecting a predetermined number of pages from the source block and the at least one candidate source block;
obtaining the overall valid page percentage according to a number of valid pages in the predetermined number of selected pages; and
re-selecting a predetermined number of pages from the source block and the at least one candidate source block after one or more pages in the source block has been copied by the GC operation and accordingly re-obtaining the overall valid page percentage according to the number of valid pages in the predetermined number of re-selected pages.

5. The method of claim 1, wherein the step of calculating the overall valid page percentage comprises:
selecting a predetermined number of pages from the source block and the at least one candidate source block;
obtaining the overall valid page percentage according to a number of valid pages in the predetermined number of selected pages; and
replacing the at least one candidate source block with at least one re-selected candidate source block;
re-selecting a predetermined number of pages from the source block and the at least one re-selected candidate source block and accordingly re-obtaining the overall valid page percentage according to the number of valid pages in the predetermined number of re-selected pages.

6. The method of claim 5, wherein the step of calculating the overall valid page percentage comprises:
determining a first weight for valid pages selected from the source block and a second weight for valid pages selected from the at least one candidate source block; and
obtaining the overall valid page percentage according to the first and second weights and the number of valid pages in the predetermined number of selected pages.

7. The method of claim 1, wherein the step of performing the GC operation comprises:
determining a GC-to-host write ratio according to a product of the GC-to-host base ratio and an adjustment factor, where the GC-to-host write ratio indicates a ratio of a write amount of valid data based on the GC operation to a write amount of user data based on host write commands; and
performing writing of valid data based on the GC operation according to the GC-to-host write ratio, while performing writing of user data based on the host write commands.

8. A controller for use in a flash memory to control the flash memory and manage a garbage collection (GC) operation on the flash memory, comprising, comprising:
a storage unit, arranged to store information and program codes;
a processing circuit, operable to execute the program codes to be arranged to:
select a source block and at least one candidate source block from the flash memory;
calculate an overall valid page percentage according to a number of valid pages in the source block and the at least one candidate source block;
determine a GC-to-host base ratio according to the overall valid page percentage; and
perform the GC operation on the source block according to at least the GC-to-host base ratio;
wherein the processing circuit is arranged:
determine a weight for each of the source block and the at least one candidate source block, where the weight of the source block is greater than the weight of the at least one candidate source block;
calculate a valid page percentage for each of the source block and the at least one candidate source block; and
obtain the overall valid page percentage by calculating a weighted average of percentages of valid pages of the source block and the at least one candidate source block based on the weights of the source block and the at least one candidate source block.

9. The controller of claim 8, wherein the processing circuit is arranged to:
calculate a valid page percentage for each of the source block and the at least one candidate source block; and
obtain the overall valid page percentage by calculating an average of valid page percentages of the source block and the at least one candidate source block.

10. The controller of claim 8, wherein the processing circuit is arranged to:
determine the weight for each of the source block and the at least one candidate source block according a numbers of invalid pages in each of the source block and the at least one candidate source block.

11. The controller of claim 8, wherein the processing circuit is arranged to:
select a predetermined number of pages from the source block and the at least one candidate source block;
obtain the overall valid page percentage according to a number of valid pages in the predetermined number of selected pages; and
re-select a predetermined number of pages from the source block and the at least one candidate source block after one or more pages in the source block has been copied by the GC operation and accordingly re-obtaining the overall valid page percentage according to the number of valid pages in the predetermined number of re-selected pages.

12. The controller of claim 8, wherein the processing circuit is arranged to:
    select a predetermined number of pages from the source block and the at least one candidate source block;
    obtain the overall valid page percentage according to a number of valid pages in the predetermined number of selected pages; and
    replace the at least one candidate source block with at least one re-selected candidate source block after one or more pages in the source block has been copied by the GC operation;
    re-select a predetermined number of pages from the source block and the at least one re-selected candidate source block and accordingly re-obtaining the overall valid page percentage according to the number of valid pages in the predetermined number of re-selected pages.

13. The controller of claim 12, wherein the processing circuit is arranged to:
    determine a first weight for valid pages selected from the source block and a second weight for valid pages selected from the at least one candidate source block; and
    obtaining the overall valid page percentage according to the first and second weights and the number of valid pages in the predetermined number of selected pages.

14. The controller of claim 8, wherein the processing circuit is arranged to:
    determining a GC-to-host write ratio according to a product of the GC-to-host base ratio and an adjustment factor, where the GC-to-host write ratio indicates a ratio of a write amount of valid data based on the GC operation to a write amount of user data based on host write commands; and
    performing writing of valid data based on the GC operation according to the GC-to-host write ratio, while performing writing of user data based on the host write commands.

15. A storage system, comprising:
    a flash memory; and
    a controller for controlling the flash memory and managing a garbage collection (GC) operation on the flash memory, the controller arranged to:
        select a source block and at least one candidate source block from the flash memory;
        calculate an overall valid page percentage according to a number of valid pages in the source block and the at least one candidate source block;
        determine a GC-to-host base ratio according to the overall valid page percentage; and
        perform the GC operation on the source block according to at least the GC-to-host base ratio;
    wherein the controller is arranged to:
        determine a weight for each of the source block and the at least one candidate source block, where the weight of the source block is greater than the weight of the at least one candidate source block;
        calculate a valid page percentage for each of the source block and the at least one candidate source block; and
        obtain the overall valid page percentage by calculating a weighted average of percentages of valid pages of the source block and the at least one candidate source block based on the weights of the source block and the at least one candidate source block.

* * * * *